Patented Aug. 24, 1943

2,327,911

UNITED STATES PATENT OFFICE 2,327,911

CELLULOSE DERIVATIVE AND PROCESS OF MAKING SAME

Leon Lilienfeld, deceased, late of Vienna, Germany, by Emerich Hunna, executor, Vienna, Germany; Antonie Lilienfeld, administratrix of said Leon Lilienfeld, deceased, assignor to Lilienfeld Patents Inc., Boston, Mass., a corporation of Massachusetts No Drawing. Application January 17, 1940, Serial No. 314,359. In Great Britain March 14, 1930

12 Claims. (Cl. 260—231)

Statements are to be found in the hitherto existing literature on cellulose ethers, that the alkyl ethers of cellulose prepared by acting upon alkali cellulose with alkylating agents without extraneous supply of heat, if insoluble in water, are insoluble or only sparingly soluble in aqueous alkali solutions. In the earlier research work of the inventor, so far as aiming at the preparation of alkyl derivatives of cellulose that are soluble in aqueous caustic alkali solution but not soluble in water, the alkylation was always performed while heating to cause the reaction. Consequently, the processes resulting from the inventor's past researches on this problem and described in U. S. Patent No. 1,589,606 are based upon heating cellulose or its near conversion products or its derivatives with alkylating agents, in the presence of alkali.

The present invention is based on the discovery that it is possible to produce technically highly valuable alkyl derivatives of cellulose which are soluble in aqueous solutions of caustic alkalies, but insoluble or only sparingly soluble in water, by acting upon cellulose or its near conversion products with alkylating agents, (such for example as dialkyl sulphates, alkyl halides, etc.) without extraneous supply of heat and, in some cases, even by checking or reducing the evolution of heat occurring in the reaction which is an exothermic one.

The process may be carried out in very simple manner. It consists essentially in treating without extraneous supply of heat, bleached or unbleached cellulose, or a material containing cellulose, or a near conversion or oxidation product of cellulose with one or more alkylating agents in the presence of an amount of alkali which is smaller than the weight of the water present.

The alkali may be added either by steeping the cellulose in an excess of a solution of alkali and removing the excess of alkali solution by pressing, centrifuging or the like, or by mixing or kneading the cellulose with the required quantity of alkali solution. In general the first mentioned method is preferred.

The alkylating agent may be employed in the undiluted state or diluted with a suitable diluent (for example benzol or the like).

The amount of the alkylating agents, for example di-alkyl sulphates employed in the present process may be large (for example, one to two— in certain cases even more—molecular proportions of the alkylating agent for each $C_6H_{10}O_5$-molecular unit of cellulose) or small (for instance 0.2 to 0.8 molecular proportion of the alkylating agent, for example di-alkyl sulphate, to one $C_6H_{10}O_5$-molecular unit of cellulose). According to the inventor's knowledge, however, very good results are obtained when small or moderate proportions of, say, 0.3 to 1 molecular proportion of the alkylating agent, for example a di-alkyl sulphate, are used for each $C_6H_{10}O_5$-molecular unit of cellulose.

The treatment of the cellulose with alkali and with the alkylating agent may be carried out simultaneously, or successively in either order.

The reaction may also be conducted in the presence of a catalyzer, such as a small quantity of a copper salt, or nickel salt or iron salt.

In order to work up the reaction mixture after the reaction is completed, the reaction mixture is either dissolved as such at a low temperature such as 0° C. or between —10° C. and +5° C., by the addition of water (when unused alkali is present in sufficient quantity), or by the addition of a solution of caustic alkali at such low temperature, and is put to the technical use contemplated, if necessary after previously filtering, straining through cloth or centrifuging. Or the ether may be isolated, for example, by merely washing the reaction mass with water or other solvent for alkalies and salts (for instance, aqueous alcohol). The washing may also be preceded by neutralization of the alkali present in the reaction mixture, or by acidification of the mixture, particularly when there is present in the mixture a large excess of alkali which would bring the final product into solution on addition of water, if at a sufficiently low temperature. The washed alkyl derivative of cellulose may then either be dissolved in an aqueous alkali solution, or dried. The isolation of the product may also be carried out in the following manner: The reaction mixture is dissolved as described above, the solution is freed if necessary from undissolved constituents by filtering, straining, centrifuging or the like, and then mixed with an acid, an acid salt, or any other substance capable of neutralizing the alkali, such as an ammonium salt, in quantity sufficient to neutralize the alkali, or in excess of this quantity, and the precipitate is thoroughly washed, and, if desired, dried. The drying may also be preceded by a dehydration with alcohol, which is not a solvent for these ethers, at any temperature. The compounds isolated by any method may be purified, for example by dissolving in a dilute aqueous solution of an alkali and precipitating by means of an acid or the like.

The alkyl ethers of cellulose made according to the present invention, usually do not dissolve (at least to any useful extent, and mostly not at all) in a dilute aqueous caustic alkali solution, e. g. NaOH solution of 5 to 10% strength, at room temperature. They dissolve readily therein, however, when refrigerated, say at 0° C., or at temperatures between the freezing point of such caustic alkali solution and room temperature. The solutions so produced, in the cold, can be warmed up (or allowed to warm up naturally) to room temperature, or they can be heated to substantially above ordinary room temperature (e. g. to 40° C.) without jellifying or becoming insoluble. This mode of dissolving cellulose ethers which do not readily dissolve at ordinary room temperature, is disclosed in a prior British Patent 212,864, accepted Oct. 2, 1924, see page 3 lines 62—71 thereof.

The alkyl ethers of cellulose made in accordance with the present invention are not soluble in the customary organic solvents, e. g. alcohol, alcohol-benzol mixture (1:1 by volume) acetic acid, chloroform, acetone, chloroform-acetone mixture, ether, carbon tetrachloride, methyl-ethyl-ketone, dichlorethylene, actelylene-tetrachloride, or pyridine.

When acted on by a hydrohalogen acid (such as hot concentrated hydriodic acid) the alkyl derivatives of cellulose produced according to the present process yield by decomposition the corresponding alkyl halides. That is, the products respond to the well known Zeisel test for ethers.

The process described in Lilienfeld's U. S. Patent No. 1,589,606 for the manufacture of alkyl derivatives of cellulose soluble in alkalies, are in many respects surpassed by the process herein described. Moreover, the products, i. e. the alkyl celluloses prepared according to the present process are superior in many respects to the products obtainable by the processes described in the said specification. The possibility of conducting the process without extraneous supply of heat not only renders it more simple, handy and economical, but also affords a considerable protection of the cellulose molecule against alkalies to which it is particularly sensitive at raised temperatures. The most important advantage, however, lies in the superiority of the cellulose compounds themselves which, in the form of technical products, such as films, threads, coverings or the like possess greater tensile strength and are more flexible, than the alkyl derivatives produced according to said U. S. Patent 1,589,606.

The conversion of the alkyl derivatives of cellulose prepared according to the present invention into artificial structures, for example artificial threads, films, coatings of any kind and the like, can be effected, for example, by bringing an aqueous alkaline solution of an alkyl derivative of cellulose made in accordance with this invention, into the form of the desired artificial structure and acting upon the thus shaped solution with a coagulating agent, for example any of the commonly used coagulating baths of the viscose art. The alkyl derivatives of cellulose produced according to the present invention can be transformed into artificial structures also by contacting their shaped aqueous alkaline solutions with an agent or agents which has or have both a coagulating effect on the shaped solution and a plasticizing effect on the freshly coagulated material. As coagulating and plasticizing agents, baths containing at least 35 per cent of sulphuric acid monohydrate (for example 50 to about 80 per cent of sulphuric acid monohydrate) or an equivalent amount of another mineral acid have proved suitable. The coagulating and plasticizing of the shaped aqueous alkaline solution may also occur in two steps by acting upon the shaped solution first with one or more agents which have only a coagulating effect on the shaped solution and then with one or more agents (for example strong mineral acids, particularly strong sulphuric acid) which have a plasticizing effect on the freshly coagulated material.

It is impossible to here indicate every condition for success in every particular case, and it is to be understood that preliminary experiments cannot be avoided to find what are the best working conditions when using a particular kind of cellulose, a particular method of incorporating the alkali with the cellulose and when using a particular alkylating agent.

The following examples of operations serve as a practical illustration of the invention, which, however, is in no way limited to the examples; the parts are by weight:

*Example 1.*—1000 parts of wood pulp (moisture 9 to 10 per cent) or 1000 parts of cotton linters (moisture 7 to 8 per cent) are steeped in 20,000 parts of aqueous caustic soda solution of 18 per cent strength at 15° C. and the reaction mixture is allowed to stand for 3 hours at room temperature. After this time the alkali cellulose is pressed down to 3400 parts and comminuted in a cooled shredder for 3 hours at 12 to 13° C., whereupon 600 parts of di-methyl sulphate are added in a few portions, and the reaction mass kneaded in the shredder for about 3 hours.

The methyl cellulose produced in this example, after purification and isolation, was found by analysis to contain 1.6% of methyl group (which corresponds to 1 methyl group to each 5.35 $C_6H_{10}O_5$-molecular units of cellulose).

Soon after the addition of the di-methyl sulphate the temperature of the reaction mass rises to about 23° C. and thereafter to about 26–30° C. and is kept at this temperature until the end of the kneading. A sample taken out immediately after the three hours of the kneading shows that the mass has become practically wholly soluble in aqueous caustic soda solution (for example of 5 to 10 per cent strength) and that the solution, on being acidified with dilute sulphuric acid, yields a bulky precipitate.

The reaction mass is now transferred to a vessel, provided with a lid and kept in the closed vessel for about 20 hours at 18° C. After that time it is placed on a straining cloth or in a filter press and washed with water until free from alkali, whereupon it is pressed down to about 4 times the weight of the parent cellulose. A sample taken out shows that the washed product of the reaction is readily soluble in dilute caustic soda (for example of 10 per cent strength) and also in strong caustic soda solution (for example of 15 to 18 per cent strength). It is then either dried (optionally after having been dehydrated with alcohol and, if desired, extracted with ether), or directly dissolved in such amounts of caustic soda and water (under refrigeration) as to yield a solution containing say, 5 per cent of the dry residue of the washed product (in which the water content has been determined) and 8 per cent of NaOH. The solution thus obtained is an excellent viscous solution practically free from undissolved constituents. It may be directly worked up into artificial materials (for example, according to the following examples 17 to 24, or, after being diluted with caustic soda solution of 8 per cent strength, it may, if desired, be freed from any undissolved particles as by filtration or the like, and then precipitated by acidifying with an acid (for example, sulphuric acid).

The precipitate obtained is separated from the mother liquor, washed until free from acid and dried at atmospheric or reduced pressure, if desired after previously dehydrating it with alcohol and washing with ether. After grinding, it forms a white powder, insoluble in water, but soluble in dilute aqueous caustic alkali solution, for instance, a caustic soda solution of 5–8 per cent. strength. This dissolving can be effected at ordinary temperature i. e. without refrigerating or at a lower temperature.

A solution of the substance in aqueous caustic soda solution (for instance of 5 to 10 per cent strength) is clear and viscous and, when spread on a glass plate and treated with a dilute acid or with any of the commonly used precipitating agents of the viscose industry, yields a clear, tough film which, after washing and drying, is transparent and flexible.

*Example 2.*—The process is conducted as in Example 1, but with the difference that the cooling of the shredder is maintained throughout the whole reaction, so that the temperature of the reacting mass is kept throughout the whole time of reaction at 15° C. and that also during the 20 hours of standing after kneading the temperature does not exceed 15° C.

The properties and solubility of the final product are similar to those of the product obtained in Example 1.

*Example 3.*—Mode of procedure as in Examples 1 or 2, with the exception that the washing is performed immediately after the kneading step, i. e. three hours after addition of the di-methyl sulphate.

*Example 4.*—The process is carried out as in any one of the preceding examples, but with the difference that, after the reaction is completed, the reaction mass is not washed, but, after its content in water and NaOH has been determined, directly dissolved in aqueous caustic soda solution (e. g. at 0° C.) and the solution thus obtained (if necessary after having been filtered) employed for technical purposes, or, after having been further diluted with dilute aqueous caustic soda solution and filtered, used for the isolation of the methyl ether of cellulose, for example by the method described in Example 1.

*Example 5.*—The process is conducted as in any one of the Examples 1 to 4 with the difference that, instead of 600 parts, only 300 parts of di-methyl sulphate are allowed to act upon the alkali cellulose.

The washed reaction mass is soluble in dilute aqueous caustic soda solution of 10 per cent strength with no residue or a slight residue only, so that, in order to isolate the final product in its pure state by precipitation of its solution, in the latter case filtration or centrifuging of the solution is recommended.

The purified methyl ether will be found to contain about 1.51% of methyl group (corresponding to 1 $CH_3$ per 5.6 $C_6H_{10}O_5$-molecular units of cellulose).

*Example 6.*—The process is conducted as in Example 5, with the exception that, instead of 300 parts, only 100 to 200 parts of di-methyl sulphate are employed. The solution of the crude reaction mass in caustic soda solution of 10 per cent strength contains a small amount of undissolved particles so that it is recommended to carry out the isolation of the pure product (if such be desired) by dissolving the reaction mass in dilute caustic soda solution, filtration and precipitation as described in Example 5.

The ethers produced (using respectively 100 or 200 parts of the di-methyl sulphate) will be found (after purification) to contain 0.67% and 1.37% respectively, of the methyl group. These figures correspond respectively to one methyl group of 12.7 and 6.5 $C_6H_{10}O_5$-molecular units of cellulose.

*Example 7.*—The process is conducted as in Example 1, but with the difference that, instead of 600 parts, 1000 parts of di-methyl sulphate are used.

The methyl cellulose produced in this example, after purification and isolation, was found by analysis to contain 2.96% of methyl. This corresponds to 1 methyl group to 2.88 $C_6H_{10}O_5$-molecular units of cellulose.

*Example 8.*—The process is conducted as in Example 1, but with the difference that, instead of 600 parts, 1500 parts of di-methyl sulphate are used.

If no cooling is applied to the reacting mass, after the addition of the di-methyl sulphate, the temperature rises to 50° to 60° C., but cools within 1 to 2 hours to 18 to 25° C.

The methyl cellulose produced in this example, after purification and isolation, was found to contain 3.18% of methyl. This corresponds to 1 methyl group to 2.68 $C_6H_{10}O_5$-molecular units of cellulose.

It will be observed that in this example, the ratio of mols. of dimethyl sulphate to $C_6H_{10}O_5$-molecular units of cellulose, used in preparing the methylated cellulose, is somewhat over 2:1, but only a fraction of the methyl content of the methyl group is found to be in the form of methyl ether of cellulose, in the reaction product.

*Example 9.*—The process is conducted as in Example 6, but with the difference that, instead of the di-methyl sulphate, 1100 parts of di-ethyl sulphate are employed.

The isolated and purified ethyl cellulose so produced was found to contain 4.73% of ethyl radical. This corresponds to 1 ethyl group per 3.22 $C_6H_{10}O_5$-molecular units of cellulose.

*Example 10.*—The process is conducted as in Example 6, but with the difference that, instead of the stated amount of di-methyl sulphate, 600 parts of di-ethyl sulphate are employed. The ether after purification will contain about 4.31% of $C_2H_5$ or in other words, for each ethyl group there will be present in the ether about 3.54 $C_6H_{10}O_5$-molecular units of cellulose.

*Example 11.*—The process is conducted as in Example 10, but with the difference that, instead of 600 parts, 300 parts of di-ethyl sulphate are employed. The purified ethyl cellulose ether contains about 2.66% of ethyl group. This is one $C_2H_5$ group for about 5.72 $C_6H_{10}O_5$-molecular units of cellulose. The solubility of the product is substantially like the solubility of the methyl ether in Example 1.

*Example 12.*—The process is conducted as in Example 10, but with the difference that, instead of the di-ethyl sulphate, a mixture of 100 to 200 parts of di-methyl sulphate with 100 parts of di-ethyl sulphate are employed to give rise to the production of a mixed ether. This result can also be obtained by allowing two or three alkylating agents different in the alkyl groups contained therein, to act upon alkali cellulose in two or three consecutive steps, for example by adding 100 to 300 parts of di-ethyl sulphate to the reaction mass produced in any of the Examples 1 to 8 from the action of di-methyl sulphate upon alkali cellulose after the first 6 hours of shredding (3 hours in absence and 3 hours in presence of di-methyl sulphate), and kneading the reaction mass with the di-ethyl sulphate for another 3 hours.

*Example 13.*—1000 parts of wood pulp (moisture 9 to 10 per cent) or 1000 parts of cotton linters (moisture 7 to 8 per cent) are steeped in 20,000 parts of caustic soda solution of 18 to 21 per cent strength at 15° C. and the mass thus obtained is allowed to stand for 3 hours at room temperature. After this time the alkali cellulose is pressed down to 3400 parts and comminuted in a shredder for 3 hours at 12 to 13° C., whereupon 2900 parts of di-ethyl sulphate are added in a few portions, and the reaction mass kneaded in a shredder for about 3 hours. Thereafter the reaction mass is transferred to a vessel provided with a lid and kept in the closed vessel for 21 hours at 20° C.

The reaction mass is now placed in a filter press or on a straining cloth, and if desired, washed with water until free from alkali, whereupon it is pressed down to about three to four times the weight of the parent cellulose. The water content of the pressed product is determined by drying a sample at 105° C.

The mass is now (at 15° C.) well mixed with such amounts of water and caustic soda as, together with the water present in the case, will give 20,000 parts of a caustic soda solution of 18 per cent strength.

The isolated ethyl ether of cellulose so produced, after purification, was found to contain 1.84% of ethyl radical, corresponding to one ethyl group to 8.28 $C_6H_{10}O_5$-molecular units of cellulose.

*Example 14.*—The process is conducted as in Example 13, but with the difference that, instead of 2900 parts, 2200 parts of diethyl sulphate are employed.

The isolated ethyl ether of cellulose resulting from this example, after purification was found to contain 1.44% of ethyl radical, i. e. one ethyl radical for 10.57 $C_6H_{10}O_5$-molecular units of cellulose.

In Examples 13 and 14, the alkali cellulose can be allowed to mature, e. g. for 48 hours at 15–20° C.

In Examples 9, 10, 11 and 12 the crude reaction mass is only partly soluble in 10 per cent. caustic soda solution, so that, in the event of the isolation of the ethyl cellulose in pure state being desired, the solutions should be filtered before being precipitated.

In general the methyl ethers of cellulose are soluble in caustic alkali solution of the same concentration to a greater extent than the ethyl ethers of cellulose. Furthermore, in most cases the methyl ethers of cellulose give better shaped structures than the ethyl ethers. Both these facts could not have been expected.

*Example 15.*—Mode of procedure as in any of the foregoing examples, but with the difference that, before being contacted with the di-methyl or di-ethyl sulphate, the alkali cellulose is allowed to mature for a short time, say 12 to 24 hours, or for a longer time, say 24 to 60 hours, at 15° C. to 20° C.

As a matter of course, the maturing of the alkali cellulose has a great effect on the properties of the cellulose ethers produced therefrom. In general it may be stated that the degree of solubility of the cellulose ethers in dilute caustic alkali solution is in functional relation to the degree of maturing, that is to say, the higher the degree of maturing, the greater the solubility of the cellulose ethers in dilute caustic alkali solution. With regard to the degree of viscosity, it may be taken as a rule that the higher the degree of maturing of the alkali cellulose, the lower the viscosity.

*Example 16.*—The process is conducted as in any one of the preceding examples, with the exception that, before addition of the di-methyl or di-ethyl sulphate, 20 parts of copper acetate dissolved in 30 parts of water are incorporated with the alkali cellulose.

The alkali cellulose used in any of the above examples may also be prepared by mixing the cellulose in a suitable mixing apparatus, for example, a kneading machine, a shredder, an edge mill or the like, with an amount of caustic soda solution equal to that which remains in the soda cellulose in Example 1, after it has been pressed and this alkali cellulose may be treated with the di-alkyl sulphate either immediately after the mixing process or after it has been allowed to stand for some time.

In the above examples the degree of pressing of the alkali cellulose may be varied as desired (for example to 2, 4 or 6 parts calculated on 1 part of cellulose).

Instead of bleached or unbleached cellulose a conversion product of cellulose which is insoluble in alkalies may be used as the parent material (for instance a cellulose which has been hydrated or hydrolyzed by chemical action such as by mercerisation with subsequent washing and, if necessary, drying; by the action of a strong mineral acid; by heating with a weak mineral acid; or by treatment with a zinc halide; or by a mechanical process, such as grinding in the presence of water, or the like; or an oxy-cellulose which is insoluble in alkalies), in short any body of the cellulose group which has been proposed for the manufacture of viscose or ammoniacal-copper-oxide-cellulose.

In the specification and the claims, wherever the context permits, the expression "cellulose" includes the above mentioned cellulosic bodies.

In the foregoing examples, instead of the di-alkyl sulphates used therein other inorganic esters of mono-valent alcohols, for example methyl-iodide or methyl bromide, or ethyl iodide or propyl iodide may be used. The halogen element of these esters, and the $SO_4$ radical of the dialkyl sulphates will hereinafter be termed "inorganic acid residue".

*Example 17.*—100 parts of a methyl or ethyl ether of cellulose, prepared according to any one of the preceding examples, are dissolved in 900 to 1200 parts of a solution of caustic soda of 5 to 8 per cent strength, whilst stirring, kneading or the like. This solution, after filtering if necessary, is distributed in the shape of a layer by means of a suitable hopper and coagulated by any of the commonly used precipitating baths known in the viscose art, for example one composed of sulphuric acid, a salt and an organic substance, such as sugar. The solidified film is thoroughly washed with water and dried. The continuous film may be treated before or after drying with an aqueous solution of glycerine (for instance, of 10 per cent strength), in order to increase its flexibility.

The films produced in the foregoing example appear characterized by a great resistance to repeated bending at the same point or on the same line. Thus it is possible to produce, according to the examples, films which, when having a thickness of 0.05 millimeter, can be folded upon itself (e. g. on the Schopper apparatus referred to above) on the same line (180° bending) at least 45 times (and in many cases much more than this) before breaking.

*Example 18.*—A solution prepared as in Example 17 is forced to enter through a fine orifice, as a thread-like stream, into a precipitating bath, e. g. any one of the commonly used setting baths for viscose, and the solidified thread which forms is thoroughly washed with water and dried. The artificial thread may be treated either in the course of its manufacture or when completed with a hardening agent, such as formaldehyde or the like. Setting baths such as sulphuric acid of over 35% strength (e. g. 50 to 80%) can likewise be used for the coagulation.

*Example 19.*—A mixture of 50 parts of viscose (prepared in the usual manner and containing 8 to 10 per cent by weight of cellulose), and 50 parts of a solution of a methyl or ethyl ether of cellulose prepared as in Example 15, is spun into artificial thread as described in Example 16.

*Example 20.*—Mode of procedure as in Example 18 or 19, but with the difference that sulphuric acid of 30–70 per cent strength is used as coagulating bath and the spinning is performed in a manner similar to the methods described in my U. S. patent specification Nos. 1,683,199 and 1,683,200 and in my British patent specification No. 274,690.

*Example 21.*—A woven fabric, such as cotton fabric, is provided by means of a suitable machine, such as a backfilling machine or a padding machine or a spreading machine, with one or more coatings of a solution, prepared as in Example 15 or 17, and is then dried. (When more than one coating is applied it is desirable to dry the material after the application of each coating.) After the material has been dried and if desired steamed for a short time, it is introduced into a precipitating bath as referred to in Example 15 or 18, and is then washed and dried. The textile material may be treated before or after drying with a softening agent, such as a soap solution, an aqueous solution of Turkey-red oil, or an aqueous solution of glycerine.

The dressing on the fabric is fast or relatively fast to laundering and to dry-cleaning, and the fabric is not water-proofed or rendered water-resistant.

*Example 22.*—The procedure is as in Example 21, with the exception that there is added to the solution a filling material, for instance, zinc-white, china-clay, or talc.

*Example 23.*—The procedure is as in Example 21 or 22, with the exception that there is added to the solution a softening agent, such as a drying or non-drying oil, or a soap.

*Example 24.*—The procedure is as in Example 21, 22 or 23, with the exception that the solution is mixed with a solution of starch.

The expression "artificial structures" used in the specification and claims includes: Artificial threads, particularly artificial silk; films; coatings and layers of every kind; dressings on textiles, paper, leather and the like; sizing on yarns; book cloth; artificial leather; articles comprising parts joined by adhesives and cements; plates and shaped plastic compositions in general; coatings comprising thickening agents or fixing agents for pigments in textile printing and the like.

An important advantage, inherent in the artificial structures produced according to the above examples, is the very high degree of flexibility and pliability and toughness of the products.

As an illustration of this, a film of 0.5 millimeter thickness, made by coating a solution of an alkyl cellulose prepared in accordance with Example 17 (made from the cellulose ether produced by Example 1) by means of a 25% ammonium sulphate solution or of 10% sulphuric acid or of a 10% solution of ammonium sulphate in dilute sulphuric acid, or by means of a solution of 100 parts of ammonium sulphate and 100 parts of glycerine in 800 parts of 10% sulphuric acid, can be bent double along the same line in the well known "Schopper apparatus" 45 times (and in some cases even 75 times) without breaking. This is mentioned to show the extreme pliability and toughness of the said products. The best of the alkali soluble cellulose ethers of the prior art, give films that would not stand more than 25 to 30 such bendings. Also another prominent difference between the properties of the structures made from the present alkyl celluloses on the one hand, and the properties of alkyl celluloses made in accordance with the processes known heretofore on the other, is the much better dry tenacity, and particularly wet tenacity and also the improved extensibility as compared with the alkyl celluloses made by the processes known heretofore. This fact can be observed not only in the film, but also in the artificial threads or other shaped structures produced according to the present invention.

The term "artificial threads" denotes artificial threads and spun goods of all kinds, for instance artificial silk, staple fibre, artificial cotton, artificial wool, artificial hair and artificial straw of any kind.

The expression "strong mineral acids" denotes sulphuric acid of at least 35 per cent of $H_2SO_4$, preferably at least 45 per cent of $H_2SO_4$, and as regards the other mineral acids, solution of equivalent strength.

The expression "strong sulphuric acid" or "sulphuric acid containing at least about 35 per cent of sulphuric acid monohydrate" denotes sulphuric acid having a content of 35 to 98 per cent of $H_2SO_4$.

As stated above, the alkylated derivatives, as produced in the present case, are soluble, to some extent at least, in alkali solutions of NaOH, or stronger solutions. The degree of such solubility is to some extent variable, depending on the details of the process by which the said alkylated derivatives have been produced. It is an inherent property of these compounds that although they do not dissolve directly in caustic alkali solutions at or above ordinary room temperature, they do dissolve therein when such solutions are very cold, i. e. at near the freezing point of the alkali solution, e. g. minus 10° C. to 0° C. Note in this connection that such a mode of dissolving cellulose ethers has been described in British Patent 212,864 of Lilienfeld. In this British patent, see for instance page 3, lines 62 to 71, where the making of the solutions of alkali soluble cellulose ethers and esters by refrigeration is described for the first time.

The particular alkyl ethers of cellulose described in the present case, worked up into artificial structures, particularly films, threads, coatings of every kind, dressing on textiles, etc., by the process described herein, give artificial structures that (with regard to tensile strength in the dry and wet state, toughness, flexibility, elasticity, appearance, such as lustre, transparence, color, clearness, etc. and feel to the touch) are of most excellent quality.

The present application is in part a continuation of each of applications 521,022 and 521,017, both filed March 7, 1931.

The novel artificial structures (and specifically artificial threads, films and dressed fibrous and textile materials) as described herein, and the process of producing same, as described herein are not claimed in this application but in a concurrently filed application, Serial No. 314,358.

What is claimed is:

1. Process for the manufacture of an alkyl derivative of cellulose which is at least partially soluble in aqueous alkali solutions, but substantially insoluble in water, which process comprises acting upon cellulose, without extraneous heating of the reacting mass, with at least one inorganic ester of a monovalent alcohol, in the presence of an amount of caustic alkali which, calculated as NaOH, is only a minor fraction of the weight of water present, whereby less than one alcohol radical combines with one $C_6H_{10}O_5$-molecular unit of the cellulose.

2. Process for the manufacture of an alkyl derivative of cellulose which is at least partially soluble in alkali solutions, but substantially insoluble in water, which process comprises acting upon cellulose, without extraneous heating of the reacting mass, with at least one di-alkyl sulphate, in the presence of an amount of alkali which, calculated as NaOH, is only a minor fraction of the weight of water present, whereby less than one alkyl groups becomes connected ether-fashion, with one $C_6H_{10}O_5$-molecular unit of cellulose.

3. A process which comprises acting on alkali cellulose containing less alkali, calculated as NaOH, than water, in the absence of extraneous heat, with an amount of an inorganic ester of a monovalent alcohol which is substantially less than 1 mol. of alkylating agent per molecular unit of cellulose $C_6H_{10}O_5$, to form alkyl derivatives, of cellulose in which a part only of the hydroxyl hydrogen atoms is replaced by alkyl groups, and which alkyl derivatives are at least partially soluble in aqueous caustic alkali solution but substantially insoluble in water.

4. A process which comprises acting on alkali cellulose containing several times more water than caustic alkali, figured as NaOH, in the absence of extraneous heat, with an amount of di-alkyl sulphate substantially less than 1 mol. of di-alkyl sulphate per molecular unit of cellulose $C_6H_{10}O_5$ to form an alkyl derivative of cellulose in which a part only of the hydroxyl hydrogen atoms of the cellulose molecule is replaced by an alkyl group, and which alkyl derivative is at least partially soluble in aqueous caustic alkali solution but substantially insoluble in water.

5. A process which comprises acting on alkali cellulose which contains substantially more of water than of caustic alkali, figured as NaOH, in the absence of extraneous heat, with an amount of di-methyl sulphate substantially less than 1 mol. of di-methyl sulphate per $C_6H_{10}O_5$-molecular unit of cellulose to form a methyl derivative of cellulose in which a part only of the hydroxyl hydrogen atoms of the cellulose molecule is replaced by methyl groups, and which are at least partially soluble in aqueous caustic alkali solution but substantially insoluble in water.

6. A process as claimed in claim 5, wherein the methylation is performed while cooling.

7. An alkyl cellulose which can dissolve in a refrigerated aqueous caustic alkali solution but which is not more than sparingly soluble in water, which alkyl cellulose when in the form of a film of 0.05 millimeter in thickness is capable of being bent double at least 45 times before breaking.

8. An alkyl ether of cellulose which is soluble in aqueous caustic alkali solution and containing, per one alkyl group, at least 2.68 but not over 12.7 $C_6H_{10}O_5$-molecular units of cellulose, which product has been made by reacting with an alkylating agent upon cellulose in the presence of caustic alkali and water, the amount of such caustic alkali, figured as caustic soda being only a minor fraction of the amount of such water, and said reaction being effected without extraneous heating during the etherification process.

9. An alkyl ether of cellulose which is soluble in aqueous caustic alkali solution and containing, per one alkyl group, at least 2.68 but not over 12.7 $C_6H_{10}O_5$-molecular units of cellulose, which alkyl ether is insoluble in alcohol and in acetone, and which alkyl ether of cellulose, in the form of a film 0.05 m. m. in thickness, has a Schopper fold test of at least 45.

10. An alkyl ether of cellulose which contains, per one $C_6H_{10}O_5$-molecular unit of cellulose, substantially less than one alkyl group, and which, in the form of a film of 0.05 m. m. thickness, has a Schopper fold test at least 45.

11. An alkyl ether of cellulose which contains about 2.68 to about 12.7 $C_6H_{10}O_5$-molecular units of cellulose, to one alkyl group, and which ether is soluble in aqueous caustic alkali solutions, in the cold, and which ether, in the form of a film 0.05 m. m. thick, has a Schopper fold test at least 45, and which ether has been made without supplying extraneous heat during the etherification reaction.

12. Methyl cellulose which can dissolve in a refrigerated aqueous caustic alkali solution but which is not more than sparingly soluble in water, and insoluble in alcohol and in acetone, which, when in the form of a film of 0.05 millimeter in thickness, is capable of being bent double at least 45 times before breaking, said methyl cellulose containing per one methyl group, at least several $C_6H_{10}O_5$-molecular units of cellulose.

EMERICH HUNNA,
*Executor of the Last Will and Testament of Leon Lilienfeld, Deceased.*